(12) United States Patent
Nagashima et al.

(10) Patent No.: US 6,992,166 B2
(45) Date of Patent: Jan. 31, 2006

(54) PHENOLIC RESIN AND METHOD OF PRODUCING THE SAME

(75) Inventors: Tohru Nagashima, Tsukuba (JP);
Noriaki Saito, Toyonaka (JP)

(73) Assignee: Sumitomo Chemical Company, Limited, Osaka (JP)

( * ) Notice: Subject to any disclaimer, the term of this patent is extended or adjusted under 35 U.S.C. 154(b) by 285 days.

(21) Appl. No.: 10/458,670

(22) Filed: Jun. 11, 2003

(65) Prior Publication Data

US 2004/0044161 A1    Mar. 4, 2004

(30) Foreign Application Priority Data

Jun. 14, 2002 (JP) ............................. 2002-173955

(51) Int. Cl.
    *C08G 83/00*    (2006.01)
    *C08K 3/36*    (2006.01)
    *C08L 63/00*    (2006.01)
    *C08L 65/02*    (2006.01)
    *C08L 65/04*    (2006.01)

(52) U.S. Cl. ...................... 528/212; 523/466; 525/390; 525/396; 528/219

(58) Field of Classification Search ................ 523/466; 525/390, 396; 528/212, 219
See application file for complete search history.

(56) References Cited

U.S. PATENT DOCUMENTS

| | | | |
|---|---|---|---|
| 3,004,953 A | | 10/1961 | Sonnabend |
| 3,778,409 A | * | 12/1973 | Oertel et al. ................. 524/344 |
| 3,979,462 A | * | 9/1976 | Krimm et al. ............... 568/718 |
| 5,102,962 A | * | 4/1992 | Kikuchi et al. .............. 525/534 |
| 2002/0053302 A1 | | 5/2002 | Endo et al. ............ 106/287.22 |

FOREIGN PATENT DOCUMENTS

| | | | |
|---|---|---|---|
| JP | 61145223 A | * | 7/1986 |
| JP | 05-222156 A | | 8/1993 |
| JP | 05-72404 B2 | | 10/1993 |

* cited by examiner

*Primary Examiner*—Robert Sellers
(74) *Attorney, Agent, or Firm*—Sughrue Mion, PLLC

(57) ABSTRACT

A phenolic resin obtainable by reacting a dihydroxy compound of the following formula (1) with a phenolic compound,

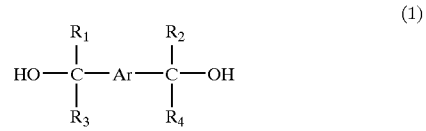

(1)

wherein the dihydroxy compound is partially dehydrated.

2 Claims, No Drawings

PHENOLIC RESIN AND METHOD OF PRODUCING THE SAME

BACKGROUND OF THE INVENTION

1. Field of the Invention

The present invention relates to a phenolic resin and a method of producing the same.

2. Description of the Related Art

Resins having a phenolic hydroxyl group in the molecule are used as materials for adhesives, paints, electronic parts and the like and as raw materials for resins such as epoxy resins, cyanate resins, ion exchange resins and the like.

As the method of producing a phenolic resin, there have been known methods in which both components of a hydroxy compound such as bis(hydroxypropyl)benzene and the like and a phenolic compound are charged into a reaction vessel, and then reacted (JP-B-5-72404) and a method in which an alkenyl compound which is a dehydrated product from a dihydroxy compound is added to a phenolic compound and reacted (U.S. Pat. No. 3,004,953).

However, when phenolic resins obtained by these methods are used as raw materials for epoxy resin, there is a problem that the resulting epoxy resin has a low hardening property, and consequently, there is a practical problem that resin components adhere to a mold for mold processing.

SUMMARY OF THE INVENTION

The present inventors have intensively studied to solve the above problems, and resultantly found that the above problems can be solved by using a phenolic compound obtained by partially dehydrating a dihydroxy compound and reacting this with a phenolic compound, leading to completion of the invention.

Namely, the present invention relates to a phenolic resin obtained by reacting a dihydroxy compound of the following formula (1) with a phenolic compound,

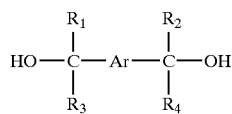

wherein, Ar represents an aromatic group having 6 to 20 carbon atoms; $R_1$ to $R_4$ represent each independently a hydrogen atom, alkyl group having 1 to 20 carbon atoms, cycloalkyl group having 5 to 20 carbon atoms or aralkyl group having 7 to 20 carbon atoms; $R_1$ and $R_3$ do not simultaneously represent a hydrogen atom, and $R_2$ and $R_4$ do not simultaneously represent a hydrogen atom:

wherein the peak area corresponding to compound (a) is in the range from 90 to 100% based on the total peak area corresponding to compounds (a) and (b), when the phenolic resin is measured by a high performance liquid chromatography method using an ultraviolet detector at a detection wavelength set at 220 nm, compound (a) has a molecular structure in which structural units derived from the dihydroxy compound and structural units derived from the phenolic compound are alternately bonded, and as the molecular end, structural units derived from the phenolic compound are bonded; and compound (a) has a molecular weight obtained by subtracting the molecular weight of 4 mol of water molecule from the total molecular weight of 2 mol of the dihydroxy compound and 3 mol of the phenolic compound, compound (b) has a molecular structure in which two of the dihydroxy compounds are mutually bonded, and as the molecular end, structural units derived from the phenolic compound are bonded, and compound (b) has a molecular weight obtained by subtracting the molecular weight of 4 mol of water molecule from the total molecular weight of 2 mol of the dihydroxy compound and 2 mol of the phenolic compound.

Also, the present invention relates to a method of producing a phenolic resin comprising the following steps (i) and (ii):

(i) a first step in which a dihydroxy compound represented by the following formula (1) is partially dehydrated by a dehydration reaction,

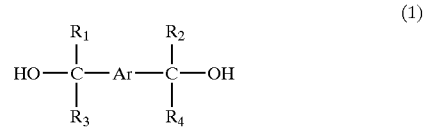

wherein, Ar represents an aromatic group having 6 to 20 carbon atoms; $R_1$ to $R_4$ represent each independently a hydrogen atom, alkyl group having 1 to 20 carbon atoms, cycloalkyl group having 5 to 20 carbon atoms or aralkyl group having 7 to 20 carbon atoms; $R_1$ and $R_3$ do not simultaneously represent a hydrogen atom, and $R_2$ and $R_4$ do not simultaneously represent a hydrogen atom, and (ii) a second step in which the partially dehydrated dihydroxy compound obtained in the first step is reacted with a phenolic compound by mol ratio of 40:100 to 90:100.

DETAILED DESCRIPTION OT THE INVENTION

The dihydroxy compound used in production of the phenolic resin of the present invention is represented by the above formula (1).

In formula (1), Ar represents a bivalent aromatic group having 6 to 20 carbon atoms, preferably having 6 to 12 carbon atoms, and listed are phenylene, naphthylene, biphenylene and the like. These aromatic groups may have a substituent such as a methyl group, ethyl group, n-propyl group, iso-propyl group, n-butyl group, iso-butyl group, tert-butyl group and the like.

In formula (1), $R_1$ to $R_4$ represent each independently a hydrogen atom, alkyl group having 1 to 20 carbon atoms, cycloalkyl group having 5 to 20, preferably 5 to 10 carbon atoms or aralkyl group having 7 to 20, preferably 7 to 10 carbon atoms. As the alkyl group, linear and branched hydrocarbon groups are listed such as, a methyl group, ethyl group, n-propyl group, iso-propyl group, n-butyl group, iso-butyl group, n-pentyl group, iso-pentyl group, n-hexyl group, iso-hexyl group and the like. As the cycloalkyl group, cyclic hydrocarbon groups are listed such as, a cyclopentyl group, cyclohexyl group and the like. As the aralkyl group, there are listed, a phenylmethyl group, phenylethyl group, phenylpropyl group, diphenylmethyl group and the like.

As the dihydroxy compound used in the present invention, there are specifically listed, bis(hydroxyethyl)benzene, bis(hydroxypropyl)benzene, bis(hydroxyethyl)biphenyl, bis(hydroxypropyl)biphenyl, bis(hydroxyethyl)naphthalene, bis(hydroxypropyl)naphthalene and the like. Preferably listed are bis(hydroxypropyl)biphenyl, bis(hydroxypropyl)naphthalene and bis(hydroxypropyl)benzene, and further preferably listed are 1,3-bis(2-hydroxy-2-propyl)benzene, 1,4-bis(2-hydroxy-2-propyl)benzene and the like. If necessary, two or more kinds of dihydroxy compounds can also be used.

Next, a phenolic compound which is another component used in production of the phenolic resin of the present invention will be described.

The phenolic compound is usually a phenolic compound represented by the following formulas (2) to (4),

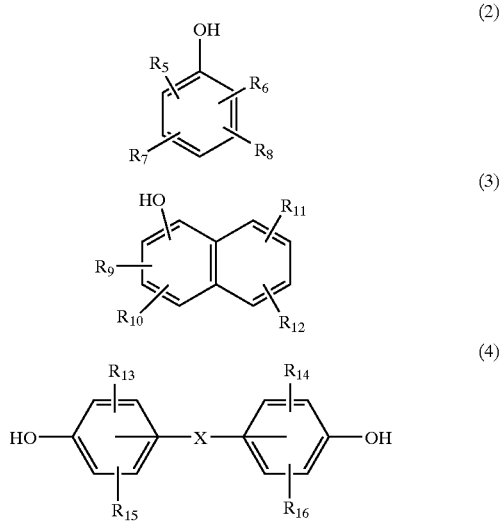

wherein, $R_5$ to $R_{16}$ represent each independently a hydrogen atom, halogen atom, aromatic group having 6 to 20, preferably 6 to 10 carbon atoms, alkyl group having 1 to 20, preferably 1 to 10 carbon atoms, cycloalkyl group having 5 to 20, preferably 6 to 10 carbon atoms, or aralkyl group having 7 to 20, preferably 7 to 10 carbon atoms; and X represents a single bond, aromatic group having 6 to 20, preferably 6 to 10 carbon atoms, alkylidene group having 1 to 20, preferably 1 to 10 carbon atom, cycloalkylidene group having 5 to 20, preferably 5 to 10 carbon atoms or aralkylidene group having 7 to 20, preferably 7 to 10 carbon atoms.

Specific examples of $R_5$ to $R_{16}$ in the above formulae (2) to (4) as the alkyl group include linear and branched hydrocarbon groups such as a methyl group, ethyl group, n-propyl group, iso-propyl group, n-butyl group, iso-butyl group, tert-butyl group, n-pentyl group, iso-pentyl group, tert-pentyl group, n-hexyl group, iso-hexyl group, tert-hexyl group and the like. As the cycloalkyl group, cyclic hydrocarbon groups such as a cyclopentyl group, cyclohexyl group and the like are listed. As the aralkyl group, a phenylmethyl group, phenylethyl group, phenylpropyl group, diphenylmethyl group and the like are listed. Specific examples when $R_5$ to $R_{16}$ represent a halogen atom include fluorine, chlorine, bromine and the like. Specific examples when $R_5$ to $R_{16}$ represent an aromatic group include phenyl group, naphthyl group, biphenyl group and the like.

Specific examples of X in the above formula (4) as the aromatic group having 6 to 20 carbon atoms include phenylene, naphthylene, biphenylene and the like. These aromatic groups may have a substituent such as a methyl group, ethyl group, propyl group, butyl group and the like.

Specific examples of X in the above formula (4) as the alkylidene group having 1 to 20 carbon atoms include ethylidene, propylidene, butylidene and the like. Specific examples of X as the cycloalkylidene group having 5 to 20 carbon atoms include cyclopentylidene, cyclohexylidene and the like. Specific examples of X as the aralkylidene group having 7 to 20 carbon atoms include phenylmethylidene, phenylethylidene, phenylpropylidene and the like.

Specific examples of the phenolic compound of formula (2) include phenols such as phenol, cresol, xylenol, ethylphenol, butylphenol, t-butylmethylphenol, phenylphenol, cumylphenol and the like, halogenated phenols such as fluorophenol, chlorophenol, bromophenol and the like.

As the specific examples of the phenolic compound of formula (3), naphthols are listed such as naphthol, methylnaphtol and the like.

As the specific examples of the phenolic compound of formula (4), bisphenols are listed such as bisphenol, bisphenol A, bisphenol F, bisphenol AD, bisphenol fluorene, bisphenol cyclohexane and the like. The phenolic compound of the present invention is not limited to the above specific examples of formulae (2) to (4).

Of phenolic compounds of formulae (2) to (4), preferable are phenol, cresol, xylenol, t-butylmethylphenol, phenylphenol, biphenol, naphthol, bisphenol A and bisphenol F, further preferable are phenol and cresol, and especially preferable is phenol. If necessary, phenolic compounds can be used in combination of two or more.

The phenolic resin of the present invention is obtained by reacting a dihydroxy compound and a phenolic compound, and usually composed of 34 to 85 mol % of structural units derived from dihydroxy compounds, and 66 to 15 mol % of structural units derived from phenolic compounds.

The phenolic resin of the present invention is composed preferably of 34 to 60 mol % of structural units derived from dihydroxy compound and 66 to 40 mol % of structural units derived from phenolic compound, more preferably of 34 to 50 mol % of structural units derived from dihydroxy compound and 66 to 50 mol % of structural units derived from phenolic compound.

The structural unit derived from a dihydroxy compound includes a structural unit having a bivalent bonding moiety in which two hydroxyl groups in the dihydroxy compound of formula (1) are removed. The structural units derived from dihydroxy compound can include: a structure having a polyvalent bonding moiety in which a hydroxyl group and one or more hydrogen atoms bonded to other carbon atom than a hydroxyl group-bonded carbon atom in the dihydroxy compound are removed; and a structure which is formed by mutual bonding of two dihydroxy compounds.

The above structural unit derived from a phenolic compound includes a structural unit having a mono-valent or polyvalent bonding moiety in which one or more hydrogen atoms directly bonded to an aromatic ring of the phenolic compound are removed.

Next, the compound (a) contained in the phenolic resin of the present invention will be described.

The compound (a) is a compound having two bivalent structural units derived from a dihydroxy compound, two monovalent structural units derived from a phenolic compound and one bivalent structural unit derived from a phenolic compound, and is a compound having no structure in which the structural units derived from dihydroxy compound are mutually bonded. In compound (a), structural units derived from a dihydroxy compound and structural units derived from a phenolic compound are alternately bonded, and as the molecular ends, structural units derived from a phenolic compound are bonded. Compound (a) has a molecular weight obtained by subtracting the molecular weight of 4 mol of water molecule from the total molecular weight of 2 mol of a dihydroxy compound and 3 mol of a phenolic compound.

As the specific example of the above compound (a), those having the following structure are listed,

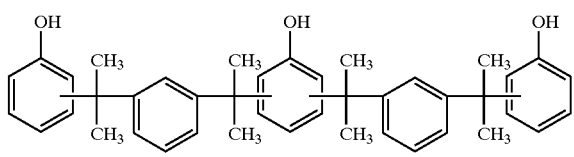
(5)

wherein phenol is used as the phenolic compound and 1,3-bis(2-hydroxy-2-propyl)benzene is used as the dihydroxy compound.

Further, those having the following structure are listed,

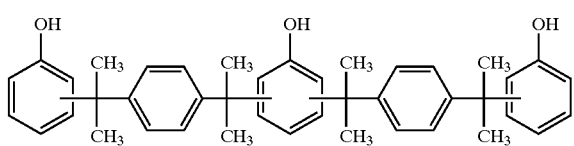
(6)

wherein phenol is used as the phenolic compound and 1,4-bis(2-hydroxy-2-propyl)benzene is used as the dihydroxy compound.

The compound (b) has a molecular structure in which two of the dihydroxy compounds are mutually bonded, and as the molecular ends structural units derived from a phenolic compound are bonded. Compound (b) has a molecular weight obtained by subtracting the molecular weight of 4 mol of water molecule from the total molecular weight of 2 mol of a dihydroxy compound and 2 mol of a phenolic compound.

As the specific example of the above compound (b), those having the following structure are listed, wherein phenol is used as the phenolic compound and 1,3-bis(2-hydroxy-2-propyl)benzene is used as the dihydroxy compound.

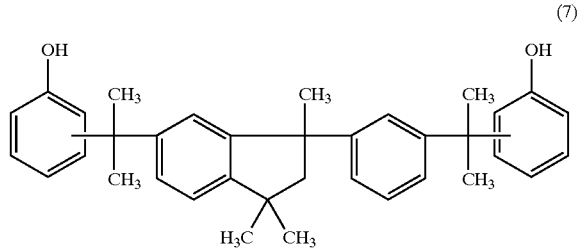
(7)

Further, those having the following structure are listed, wherein phenol is used as the phenolic compound and 1,4-bis(2-hydroxy-2-propyl)benzene is used as the dihydroxy compound.

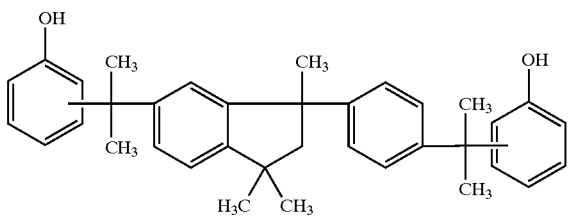
(8)

In the phenolic resin of the present invention, the peak area of compound (a) is in the range from 90 to 100% based on the total peak area of compounds (a) and (b), here the phenolic resin is measured by a high performance liquid chromatography method using an ultraviolet detector at a detection wavelength set at 220 nm. The peak area of compound (a) is more preferably in the range from 95 to 100%. When the peak area is less than 90%, a molding property tends to lower since an epoxy resin obtained by glycidyl-etherifying the phenolic resin shows a low hardening property.

A method of measuring the above peak area by a high performance liquid chromatography method is as follows.

First, a phenolic resin of the present invention is separated by a high performance liquid chromatography analysis apparatus, and methods of determining molecular weight such as introduction of separated components into a mass analysis apparatus, and the like are adopted. By such methods, it is determined which peak corresponds to the compound (a) having a molecular weight obtained by subtracting the molecular weight of 4 mol of a water molecule from the total molecular weight of 2 mol of a dihydroxy compound and 3 mol of a phenolic compound, among a plurality of peaks separated and detected by a high performance liquid chromatography analysis apparatus. Likewise, it is determined which peak corresponds to the compound (b) having a molecular weight obtained by subtracting the molecular weight of 4 mol of a water molecule from the total molecular weight of 2 mol of a dihydroxy compound and 2 mol of a phenolic compound.

Subsequently, a phenolic resin is analyzed by a high performance liquid chromatography apparatus, peak area of compounds (a) and (b) detected at 220 nm using an ultraviolet detector are measured, and the ratio of the peak area value of the compound (a) based on the total area value of the compounds (a) and (b) can be calculated.

From which phenolic compound or from which dihydroxy compound the structure of a constituent component of a phenolic resin is derived can be determined, by the following method.

For example, using methods such as thermal decomposition gas chromatography and the like, a phenolic resin is thermally decomposed to obtain a decomposed component which is analyzed and compared with a known compound. By such means, information is obtained on from which phenolic compound or from which dihydroxy compound the constituent component of a phenolic resin is derived.

Alternatively, a solution of a phenolic resin is separated by a high performance liquid chromatography analysis apparatus, and separated components are introduced into a mass analysis apparatus, and the like. From difference in molecular weights of components contained in the resulted phenolic resin, information is obtained on the molecular weight of a structural unit derived from a phenolic compound and the molecular weight of a structural unit derived from a hydroxy compound.

Next, the physical properties of the phenolic resin of the present invention will be described.

The melt viscosity of the phenolic resin of the present invention is usually in the range from 0.01 to 10 Pa·s when measured by an ICI viscometer (150° C., 50 Hz). The melt viscosity is more preferably in the range from 0.1 to 1 Pa·s. When the melt viscosity is less than 0.01 Pa·s, an epoxy resin obtained by glycidyl-etherifying the phenolic resin tends to have a lowered hardening property. When over 10 Pa·s, its molding processability tends to lower.

The softening point of the phenolic resin of the present invention is usually in the range from 50 to 150° C., and preferably in the range from 70 to 100° C. When the softening point is less than 50° C., resins are easily melted, leading to a tendency of lowering in handling. On the other hand, when over 150° C., the melt viscosity of an epoxy resin obtained by glycidyl-etherifying the phenolic resin increase, leading to a tendency of lowering in its molding processability.

The phenolic resin of the present invention has a hydroxyl group equivalent of usually from 180 to 280 g/eq., more preferably from 200 to 250 g/eq. When the hydroxyl group equivalent is less than 180 g/eq. or over 280 g/eq., there is sometimes decrease in the properties of an epoxy resin obtained by glycidyl-etherifying the phenolic resin.

The phenolic resin of the present invention has a number-average molecular weight of usually from 400 to 1400, more preferably from 600 to 1200. When the number-average molecular weight is less than 400, an epoxy resin obtained by glycidyl-etherifying the phenolic resin tends to have a lowered hardening property. On the other hand, when over 1400, its melting viscosity and softening point become too high, leading to a tendency of lowering in its molding processability.

The phenolic resin as described above can be produced by reacting a dihydroxy compound and a phenolic compound. Next, a method of producing the phenolic resin will be described.

The first step in the production method of the present invention is a step of dehydrating a dihydroxy compound by a partial dehydration reaction.

In the first step, a part of a dihydroxy compound used is dehydrated, before subjecting to reaction with a phenolic compound, to give a mixture with a dehydrated product. By partial dehydration of a dihydroxy compound, this reaction mixture includes those obtained by removing one of the two hydroxyl groups in the dihydroxy compound as a water molecule and those obtained by removing both hydroxyl groups as water molecules, in addition to the dihydroxy compound itself.

The amount of water produced from a dihydroxy compound by dehydration in the first step is preferably 50% or more and 90% or less, further preferably 60% or more and 85% or less based on the theoretical amount. When the dehydration amount is less than the above range, dihydroxy compounds not dehydrated tend to precipitate in the reaction solution. When the dehydration amount is over the above range, there is a tendency of increase of a by-product obtained by mutual reaction of dihydroxy compounds. The progress of the dehydration reaction can be confirmed by the amount of water produced in the reaction. Here, the theoretical amount means an amount when two hydroxyl groups on a dihydroxy compound are theoretically (100%) removed as water molecule from all dihydroxy compound molecules.

In the first step of the production method of the present invention, an acidic catalyst is usually used. As such an acidic catalyst, known acidic catalysts for synthesis of phenolic resin are used. Examples thereof include, but not limited to, mineral acids such as hydrochloric acid, sulfuric acid, phosphoric acid and the like, organic acids such as methanesulfonic acid, benzenesulfonic acid, toluenesulfonic acid, trifluoromethanesulfonic acid and the like, solid acids such as silica-alumina, acid clay and the like, Friedel-Crafts' catalysts such as aluminum chloride, iron chloride, zinc chloride and the like, acidic ion exchanged resins, heteropolyacids and the like. If necessary, two or more kinds of acidic catalysts can also be used.

In the first step of the production method of the present invention, a solvent is used usually in dehydrating a dihydroxy compound. As such a solvent, there are listed, hydrocarbons such as toluene, xylene, cyclohexane, heptane and the like, halogenated hydrocarbons such as chloroform, dichloromethane, 1,1,1-trichloroethane and the like, ethers such as dioxane, ethyl ether, ethylene glycol dimethyl ether, tetrahydrofuran and the like, alkoxy alcohols such as propylene glycol monomethyl ether and the like, ketones such as methyl ethyl ketone, methyl isobutyl ketone, and the like. Preferably, hydrophobic solvents such as toluene, xylene, cyclohexane and the like are suitable, but examples thereof are not limited to these compounds. If necessary, two or more kinds of solvents can be used.

The temperature in dehydration reaction is usually in the range from 40 to 250° C., and preferably from 60 to 200° C.

When a solvent or an acidic catalyst is used in the first step, the solvent and acidic catalyst used in the first step can be used as it is also in the second step to effect the reaction, or the solvent or acidic catalyst separately prepared can be used in the second step to effect the reaction. Water produced in the reaction is usually removed out of the reaction system, and as such removal method, there are listed a method of azeotropic dehydration, a method of fractionating the reaction solution after completion of the reaction and removing an aqueous layer, and the like.

The second step in the production method of the present invention is composed of a step of reacting a partially dehydrated dihydroxy compound obtained in the first step with a phenolic compound.

In the second step of the production method of the invention, there is usually used a solvent. As the solvent in this case, that which is used in the first step can be used, Alternatively, a solvent may be separately prepared and used in the second step. As the solvent used in the second step, the same solvents as used in the first step are exemplified, and of them, solvents forming an azeotropic mixture with water are suitable in the invention. Examples thereof include, but not limited to, toluene, xylene, cyclohexane, methyl isobutyl ketone and the like. If necessary, two or more kinds of solvents can also be used. It is more preferable that the solvent used in the second step is the same as that used in the first step from the standpoint of recycle of a solvent. The total amounts of solvents used in the first step and the second step is usually from 10 to 2000 parts by weight, preferably from 50 to 500 parts by weight based on 100 parts by weight of the total amount of a phenolic compound and a dihydroxy compound.

In the second step of the production method of the invention, there is usually used an acidic catalyst. As the acidic catalyst in this case, that which is used in the first step can be used itself, alternatively, an acidic catalyst may be separately prepared and used in the second step. As the acidic catalyst, the same acidic catalysts as exemplified in the first step are listed.

The total amounts of acidic catalysts used in the first step and the second step is usually from 0.001 to 1 mol, preferably from 0.001 to 0.5 mol based on 1 mol of a dihydroxy compound.

In the second step of the production method of the present invention, a partially dehydrated dihydroxy compound obtained in the first step and a phenolic compound are reacted, and usually, a partially dehydrated dihydroxy compound is added to a phenolic compound to cause a reaction.

Regarding the ratio of a partially dehydrated dihydroxy compound and a phenolic compound in the production method of the present invention, the amount of a dihydroxy compound before the dehydration is preferably 40 mol % or more and 90 mol % or less, more preferably 50 mol % or more and 80 mol % or less based on the phenolic compound. When the amount of a dihydroxy compound is less than 40 mol % based on the amount of a phenolic compound, the amount of an unreacted phenolic compound remaining in the reaction system increases, consequently, load of an operation of purifying and isolating the desired product increases. On the other hand, when the amount of a dihydroxy compound is more than 90 mol % of the amount of a phenolic compound, the resulting phenolic resin tends to have increased melt viscosity, and there is a tendency of occurrence of disadvantages in use as insulation materials, lamination plates, and electric and electronic materials of semiconductor sealing materials and the like.

A reaction solution of a partially dehydrated dihydroxy compound is added continuously or discontinuously to a reaction system containing a phenolic compound, for reaction with the phenolic compound. The addition speed is, when added continuously, usually 5 mol %/hour or more and 15 mol %/hour or less based on the amount of a phenolic compound.

In the reaction of the second step in the production method of the present invention, the reaction is usually conducted while distilling off water produced during the reaction out of the system by azeotropic dehydration. This azeotropic dehydration may be conducted under normal pressure or reduced pressure. The pressure and temperature are, though changing depending on the kind of a solvent used and the concentration of a reaction solution, usually set at conditions under which azeotropic dehydration can be effected continuously. when toluene is used as a solvent, the reaction is conducted at 85 to 135° C. under atmospheric pressure.

The progress of the reaction can be checked by tracing change of the amount of a raw material phenolic compound in the reaction system, by a method such as gas chromatography and the like. After completion of the reaction, the reaction system is neutralized, then, if necessary, washing with water and fractionation separation are conducted, then, a solvent is recovered by distillation, then, the reaction mixture is taken out in molten state. As the method of removing a raw material phenolic compound not reacted, there are listed a method of heating under reduced pressure, steam distillation, a method of introducing nitrogen into the system, and the like.

According to the production method of the invention, production of a compound (b) containing a structure formed by mutual bonding of dihydroxy compounds can be suppressed, and the desired phenolic resin can be obtained.

Next, the epoxy resin of the present invention using the above phenolic resin will be described.

The epoxy resin of the present invention can be obtained by glycidyl-etherifying a phenolic resin described above according to a known method.

As the method of glycidyl-etherifying the phenolic resin, there are listed, a method in which the above phenolic resin are charged together with epichlorohydrin into a reaction vessel and dissolved, then, they are reacted while continuously dropping sodium hydroxide, cooling epichlorohydrin and water under azeotropy to liquid and returning an organic phase into the reaction system, and the resulted reaction mixture is purified by post treatment such as washing with water, and the like, to obtain an epoxy resin. Particularly when an epoxy resin of high purity is obtained, suitable is a method of reacting a phenolic resin and epichlorohydrin in the presence of an aprotic solvent as described in JP-A-60-31517.

Next, the physical properties of the epoxy resin of the present invention will be described.

The epoxy equivalent of the epoxy resin of the present invention is usually in the range from 240 to 320 g/eq. and preferably in the range from 260 to 310 g/eq. When less than 240 g/eq., soldering crack resistance tends to be poor, and when larger than 320 g/eq., the hardening property of a resin composition using the epoxy resin tend to lower.

The melt viscosity of the epoxy resin of the present invention (measured by an ICI viscometer; 150° C., 50 Hz), is usually in the range from 0.01 to 10 Pa·s, more preferably in the range from 0.1 to 1 Pa·s. When the melt viscosity is less than 0.01 Pa·s, a hardening property tends to lower. When over 10 Pa·s, its molding processability tends to lower.

The softening point of the epoxy resin of the present invention is usually in the range from 50 to 150° C., more preferably in the range from 60 to 90° C. When the softening point is less than 50° C., solid form cannot be maintained at normal temperature or epoxy resins mutually adhere, in some cases. When the softening point is over 150° C., its molding processability tends to lower.

The number-average molecular weight of the epoxy resin of the present invention is usually in the range from 450 to 1450, and more preferably in the range from 650 to 1250. When the number-average molecular weight is less than 450, the softening point is too low, and when over 1450, its softening point becomes too high, causing a tendency of lowering in its molding processability.

The epoxy resin composition of the present invention comprises the following (A) to (C):
(A) an epoxy resin,
(B) a hardener having a phenolic hydroxyl group, and
(C) an inorganic filler.

The epoxy resin (A) is an epoxy resin obtained by glycidyl-etherifying the phenolic resin of the present invention described above. Further, a known epoxy resin may also be used in an amount not deteriorating the object of the invention.

The hardener (B) contains two or more phenolic hydroxyl groups in one molecule.

As the hardener (B), there are listed, novolak resins such as a phenol novolak resin, cresol novolak resin and the like, aralkyl resins such as a phenol aralkyl resin, cresol aralkyl resin and the like, alicyclic structure-containing resins such as a dicyclopentadiene-modified phenol resin, limonene-modified phenol resin and the like, poly-functional resins such as a triphenolmethane type resin and the like, and preferable are a phenol novolak resin, phenol aralkyl resin and the like. The hardener may be used alone or in combination of two or more.

In compounding of the hardener (B), the compounding ratio can be determined according to the combination with an epoxy resin, and usually, the compounding ratio is determined so that the glass transition temperature is higher. For example, when novolak resins and aralkyl resins and the like are used as the hardener (B), it is preferable to compound so that the epoxy equivalent to hydroxyl group equivalent is 1:1.

As the specific examples of the inorganic filler (C), there are listed, silica, alumina, titanium white, aluminum hydroxide, talc, clay and the like, in the form of powder, flake, fiber and the like. Of them, powders of silica, alumina and the like are preferable. Inorganic fillers different in their kinds and forms can also be used in admixture. It is preferable to use powders of silica, alumina and the like in spherical form and crushed form together.

The amount of the inorganic filler (C) in an epoxy resin composition is from 60 to 98% by weight, preferably from 70 to 98% by weight, further preferably from 75 to 95% by weight based on the whole epoxy resin composition. When the amount is less than 60% by weight, the water absorption of a composition increases and the soldering crack resistance thereof lowers. When over 98% by weight, the flowability of a resin composition is remarkably inferior, consequently, insulation-molding of a semiconductor becomes difficult.

Into the epoxy resin composition of the present invention, known hardening accelerators can be used. Specific examples of the hardening accelerators include organic phosphine compounds such as triphenylphosphine, tri-4-methylphenylphosphine, tri-4-methoxyphenylphosphine, tributylphosphine, trioctylphosphine, tri-2-cyanoethylphosphine and the like and tetraphenylborate salts thereof, tertiary amines such as tributylamine, triethylamine, 1,8-diazabicyclo[5.4.0]undecene-7, triamylamine and the like, quaternary ammoniums such as benzyltrimethylammonium chloride, benzyltrimethylammonium hydroxide, triethylammonium tetraphenylborate and the like, imidazoles, and the like.

Of them, organic phosphine compounds, tertiary amines, imidazoles and the like are preferable from the standpoints of moisture proof and hardening property, and among them, triphenylphosphine is particularly preferable.

In the epoxy resin composition of the present invention, if necessary, there can be added: releasing agents such as natural wax, synthetic wax, higher fatty acid and metal salts thereof, and paraffin; coloring agents such as carbon black; and surface treatment agents such as a silane coupling agent and the like. Further, flame retardants and flame retardant aids such as antimony trioxide, phosphorus compounds, brominated epoxy resins and the like may be added.

Furthermore, for the purpose of lowering the stress of a composition, elastomers and the like can be added or previously reacted with an epoxy resin or phenolic resin and compounded. The elastomers are not particularly restricted, and listed are, addition type or reaction type elastomers such as polybutadiene, butadiene-acrylonitrile copolymer, silicone rubber, silicone oil and the like.

The epoxy resin composition of the present invention can be suitably used in applications for sealing semiconductors, electronic parts and the like. For producing a resin sealing type semiconductor apparatus using this epoxy resin composition, this epoxy resin composition may be advantageously hardening-molded by conventionally known molding methods such as transfer molding, compression molding, injection molding and the like.

For hardening the epoxy resin composition of the present invention, the hardening conditions can be appropriately determined depending on the kind and ratio of the components, the kind of a catalyst, and the like. Usually, hardening can be conducted at 100 to 200° C. for less than 1 minute, and a post hardening can be conducted at 150 to 200° C. for 1 to 24 hours.

EXAMPLES

Examples of the present invention are shown below but do not limit the scope of the invention. Methods of evaluating resins, resin compositions and hardened molded articles are as described below.

Content of compound (a) based on the total amount of compounds (a) and (b) in a phenolic resin Using a high performance liquid chromatography mass analyzer (SERIES 1100 MSD, manufactured by Agilent Technologies), acetonitrile/water as a mobile phase and L-column ODS as a column (manufactured by Chemicals Evaluation and Research Institute, Japan) for analysis, components of a phenolic resin were separated and detected by APCI (Positive) mode, and the molecular weights of respective fractioned components were calculated from the mass number, and the elution times of respective fractions were confirmed. Compounds (a) and (b) identified by the elution times were detected at a wavelength of 220 nm using a UV detector, and the ratio of the compound (a) based on the total of the compound (a) and the compound (b) was calculated from the respective peak area percentages.

Epoxy equivalent: It was measured by a hydrochloric acid-dioxane method according to JIS K7236.

Softening point: It was measured by a ring and ball method according to JIS K7234.

ICI viscosity: Viscosity at 150° C. (50 Hz) was measured using an ICI viscometer.

Gelling time: It was measured at 175° C. according to JIS K5909.

Spiral flow: It was measured under a condition of 175° C./79 kg/cm$^2$ according to EMMI-1-66.

Hardness and releasing property of molded article: A disc molded article having a diameter of 5 cm and a thickness of 3 mm molded under hardening a condition of 175° C. for 2 minutes by a transfer molding machine was measured by a barcoal hardness tester just after releasing. Staining of the mold surface after molding was visually observed, and evaluated as x when stain or resin residue was observed and when clear.

Soldering crack resistance: 10 simulated ICs (52 pin QHP package (package thickness: 2.05 mm)) insulation-molded by a transfer molding machine were allowed to absorb moisture under a condition of 85° C./85% RH for 168 hours, then, immediately, immersed in a solder bath of 240° C. for 30 seconds, and the number of good articles was counted. The good article means that having no crack in a package and no peeling from a lead frame.

Example 1

Into a 500 ml round-bottom flask equipped with a thermometer, stirrer and condenser was charged 194 g (1 mol) of 1,3-bis(2-hydroxy-2-propyl)benzene, 312 g of toluene, 3.8 g of p-toluenesulfonic acid monohydrate and 15 g of water, and they were stirred at 95° C. for 2 hours, then, cooled and allowed to stand still to cause liquid separation, to obtain a reaction solution in which 1,3-bis(2-hydroxy-2-propyl)benzene had been partially dehydrated. The amount of hydroxyl groups removed in this reaction was 66% of the total amount of hydroxyl groups in the charged 1,3-bis(2-hydroxy-2-propyl)benzene, according to GC analysis.

Into a 1 L round-bottom flask equipped with a thermometer, stirrer, condenser with liquid separation tube, and dropping funnel was charged 118 g (1.25 mol) of phenol, 208 g of toluene and 3.8 g of p-toluenesulfonic acid monohydrate, and they were stirred at 115 to 125° C., and the above reaction solution was dropped into this over 6 hours. During the reaction, toluene and water under azeotropy were cooled to liquid, and an organic layer was returned into the reaction system. After the dropping, heating and stirring were continued for 2 hours before completion of the reaction.

In the reaction solution at this stage, 6.6 mol % of phenol initially charged remained.

After completion of the reaction, neutralization, solvent removing treatment and phenol removing treatment were conducted, to obtain a phenolic resin (P-1). The hydroxyl group equivalent was 230 g/eq. The number of aromatic rings (aromatic nucleuses) contained in each component was checked by gel permeation chromatography (hereinafter, referred to as GPC. Tetrahydrofuran was used as a mobile phase, and columns of TSK-gel G3000HXL, G2000HXL and G1000HXL manufactured by Tosoh Corp. were used. The components were detected by monitoring the absorption wavelength at 254 nm with an ultraviolet detector. As a result, fraction of binuclear component: 1.3%, trinuclear component: 11.0%, pentanuclear component: 13.1%, heptanuclear component: 13.4%, nonanuclear component: 12.3%, undecanuclear component: 11.2%, 13 or more nucleus components: 37.7%. Even number nuclear components having 4 or more nucleuses were not detected.

As a result of measurement by high performance liquid chromatography, a compound corresponding to a compound (b) having a structure composed of 2 structural units derived from phenol and 2 structural units derived from 1,3-bis(2-hydroxy-2-propyl)benzene could not be detected, and the content of a compound (a) corresponding to a compound having a structure composed of 3 structural units derived from phenol and 2 structural units derived from 1,3-bis(2-hydroxy-2-propyl)benzene was 100%, and the compound (a) had a molecular weight of 599.

Example 2

The same procedure as in Example 1 was conducted except that the amount of phenol charged into a 1 L round-bottom flask equipped with a thermometer, stirrer, condenser with liquid separation tube, and dropping funnel was 141 g (1.5 mol), to obtain a phenolic resin (P-2).

In the reaction solution at completion of this reaction, 13.1% of phenol initially charged remained.

The hydroxyl group equivalent of the phenolic resin (P-2) was 216 g/eq., and according to GPC analysis, binuclear component: 3.1%, trinuclear component: 18.1%, pentanuclear component: 20.7%, heptanuclear component: 17.6%, nonanuclear component: 13.6%, 11 or more nuclear component: 27.0%. Even number nuclear components having 4 or more nucleuses were not detected.

As a result of measurement by high performance liquid chromatography, a compound corresponding to a compound (b) having a structure composed of 2 structural units derived from phenol and 2 structural units derived from 1,3-bis(2-hydroxy-2-propyl)benzene could not be detected, and the content of a compound (a) having a structure composed of 3 structural units derived from phenol and 2 structural units derived from 1,3-bis(2-hydroxy-2-propyl)benzene was 100%, and the compound (a) had a molecular weight of 599.

Comparative Example 1

Into a 1 L round-bottom flask equipped with a thermometer, stirrer and condenser with liquid separation tube was charged 118 g (1.25 mol) of phenol, 194 g (1 mol) of 1,3-bis(2-hydroxy-2-propyl)benzene, 3.8 g of p-toluenesulfonic acid monohydrate and 312 g of toluene, and they were reacted by stirring at 90 to 120° C.

During the reaction, toluene and water under azeotropy were cooled to liquid, and an organic layer was returned into the reaction system. Heating and stirring were continued for 13 hours before completion of the reaction.

In the reaction solution after completion of the reaction, 19.3 mol % of phenol initially charged remained.

After the reaction, neutralization, de-solvent treatment and de-phenol treatment were conducted, to obtain a phenolic resin (P-5). The hydroxyl group equivalent was 251 g/eq. According to GPC analysis, binuclear component: 2.1%, trinuclear component: 17.3%, tetranuclear component: 10.4%, pentanuclear component: 11.8%, hexanuclear component: 10.8%, heptanuclear component: 8.0%, octanuclear component: 9.3%, 9 or more nuclear components: 30.3%.

As a result of measurement by high performance liquid chromatography, the content of compound (a) having a structure composed of 3 structural units derived from phenol and 2 structural units derived from 1,3-bis(2-hydroxy-2-propyl)benzene was 55.0%.

Comparative Example 2

The same procedure as in Comparative Example 1 was conducted except that the amount of phenol was 141 g. In the reaction solution after completion of the reaction, 25.7 mol % of phenol initially charged remained.

After this reaction, neutralization, de-solvent treatment and de-phenol treatment were conducted, to obtain a phenolic resin (P-6). The hydroxyl group equivalent was 236 g/eq., and according to GPC analysis of distribution of components, binuclear component: 3.7%, trinuclear component: 24.4%, tetranuclear component: 13.3%, pentanuclear component: 13.6%, hexanuclear component: 11.7%, heptanuclear component: 8.3%, 8 or more nuclear components: 25.0%.

As a result of measurement by high performance liquid chromatography, the content of compound (a) having a structure composed of 3 structural units derived from phenol and 2 structural units derived from 1,3-bis(2-hydroxy-2-propyl)benzene was 58.0%.

The melt viscosities and softening points of the phenolic resins in Examples 1 and 2 and Comparative Examples 1 and 2 are shown in Table 1. These phenolic resins are resinous compounds showing no clear melting point.

TABLE 1

| | Unreacted phenol ratio (mol %) | Melt viscosity (150° C., Pas) | Softening point (° C.) |
|---|---|---|---|
| Example 1 | 6.6 | 2.2 | 105 |
| Example 2 | 13.1 | 0.40 | 90 |
| Comparative example 1 | 19.3 | 0.50 | 92 |
| Comparative example 2 | 25.7 | 0.17 | 80 |

Example 3

The same procedure as in Example 1 was conducted except that the dropping time of the reaction solution in which 1,3-bis(2-hydroxy-2-propyl)benzene had been partially dehydrated was 4 hours. In the reaction solution after completion of the reaction, 13.7 mol % of phenol initially charged remained.

After completion of the reaction, neutralization, de-solvent treatment and de-phenol treatment were conducted, to obtain a phenolic resin (P-3). As a result of measurement by high performance liquid chromatography, the content ratio of the resulted compound (a) having a molecule structure composed of 3 structural units derived from phenol and 2 structural units derived from 1,3-bis(2-hydroxy-2-propyl) benzene was 94.9%. This compound (a) had a molecular weight of 599.

Example 4

The same procedure as in Example 1 was conducted except that the dropping time of the reaction solution in which 1,3-bis(2-hydroxy-2-methyethyl)benzene had been partially dehydrated was 2 hours. In the reaction solution after completion of the reaction, 15.5 mol % of phenol initially charged remained.

After completion of the reaction, neutralization, de-solvent treatment and de-phenol treatment were conducted, to obtain a phenolic resin (P-4). As a result of measurement by high performance liquid chromatography, the content ratio of the resulted compound (a) having a molecule structure composed of 3 structural units derived from phenol and 2 structural units derived from 1,3-bis(2-hydroxy-2-propyl) benzene was 91.2%. This compound (a) had a molecular weight of 599.

Comparative Example 3

Into a 1 L round-bottomed flask equipped with a thermometer, stirrer, condenser and dropping funnel was charged 118 g of phenol, 208 g of toluene, and 3.8 g of p-toluenesulfonic acid monohydrate, and 158 g of 1,3-diisopropenylbenzene was dropped while stirring at 115 to 125° C. over 2 hours. After dropping, heating and stirring were continued for 2 hours before completion of the reaction. In the reaction solution at this stage, 19.0 mol % of phenol initially charged remained.

After this reaction, neutralization, de-solvent treatment and de-phenol treatment were conducted, to obtain a phenolic resin (P-7).

As a result of measurement by high performance liquid chromatography, the content ratio of a compound (a) having a structure composed of 3 structural units derived from phenol and 2 structural units derived from 1, 3-diisopropenylbenzene was 85.0%.

Example 5

Into a 1 L baffled flask equipped with a thermometer, stirrer and condenser with liquid separation tube was charged 480 g of epichlorohydrin and 120 g of the phenolic resin (P-1) and dissolved.

43 g of a 48.9% sodium hydroxide aqueous solution was continuously dropped while refluxing the reaction solution at 55 to 60° C. under 15 kPa, and they were reacted while cooling epichlorohydrin and water under azeotropy to liquid and returning an organic phase into the reaction system.

After completion of the reaction, epichlorohydrin was removed by concentration under reduced pressure, the resin was dissolved in methyl isobutyl ketone, and a by-produced salt was removed by washing with water. Then, methyl isobutyl ketone was removed by concentration under reduce pressure, to obtain an epoxy resin (E-1). This epoxy resin had a softening point of 82° C., an ICI viscosity of 0.60 Pa·s, and an epoxy equivalent of 309 g/eq.

100 parts by weight of this epoxy resin (1), 55 parts by weight of a phenol aralkyl resin (trade name: MILEX XL, manufactured by Mitsui Chemical Co., Ltd.), 4.0 parts by weight of a hardening accelerator (triphenylphosphine), 878 parts by weight of a filler (silica), 1.5 parts by weight of a releasing agent (carnauba wax), further, 2 parts by weight of a coupling agent (trade name: SH-6040, manufactured by Toray Dow Corning Silicone K.K.) were kneaded under read by rolls, to obtain an epoxy resin composition. This epoxy resin composition had a gelling time of 18 seconds, and a spiral flow of 31 cm.

This epoxy resin composition was subjected to transfer molding to mold a simulated IC package, and the soldering crack resistance test was conducted according to the above method, to find no cracking and peeling of the package. The mold after molding were observed, to find clean surface of the mold, and no staining and no resin residue.

Examples 6 to 8 and Comparative Examples 4 to 6

The phenolic resins (P-2 to P-7) were glycidyl-etherified in the same manner as in Example 5, to obtain corresponding epoxy resins (E-2 to E-7). The physical properties are shown in Table 2.

Further, the epoxy resins (E-2 to E-7) were used and a hardener, hardening accelerator, filler, releasing agent and coupling agent were compound in amount ratios shown in Table 3, and epoxy resin compositions were obtained in the same manner as in Example 5. Using the epoxy resin compositions, simulated IC packages were molded.

Table 4 shows the gelling times and spiral flows of the epoxy resin compositions, and the hardness of the molded articles, surface state of the mold, and the soldering crack resistances of the IC packages.

TABLE 2

Physical properties of epoxy resins

|  | Epoxy resin | Softening point (° C.) | ICI viscosity (Pa · s) | Epoxy equivalent (g/eq) |
|---|---|---|---|---|
| Example 5 | E-1 | 82 | 0.62 | 309 |
| Example 6 | E-2 | 67 | 0.21 | 294 |
| Example 7 | E-3 | 70 | 0.22 | 302 |
| Example 8 | E-4 | 65 | 0.19 | 308 |
| Comparative Example 4 | E-5 | 70 | 0.21 | 327 |
| Comparative Example 5 | E-6 | 58 | 0.11 | 321 |
| Comparative Example 6 | E-7 | 65 | 0.19 | 315 |

TABLE 3

Compounding of epoxy resin composition

| Compounding ratio (part by weight) | Example | | | | Comparative Example | | |
|---|---|---|---|---|---|---|---|
| | 5 | 6 | 7 | 8 | 4 | 5 | 6 |
| Epoxy resin | E-1 | E-2 | E-3 | E-4 | E-5 | E-6 | E-7 |
| | 100 | 100 | 100 | 100 | 100 | 100 | 100 |
| Hardener | 55 | 58 | 56 | 55 | 52 | 53 | 54 |
| Hardening accelerator | 4 | 4 | 4 | 4 | 4 | 4 | 4 |
| Filler | 878 | 894 | 886 | 879 | 861 | 867 | 872 |
| Releasing agent | 1.5 | 1.5 | 1.5 | 1.5 | 1.5 | 1.5 | 1.5 |
| Coupling agent | 2 | 2 | 2 | 2 | 2 | 2 | 2 |

Filler Constitution

1. Crushed silica (average particle size: 5.6 im), FS-20 manufactured by Denki Kagaku Kogyo K.K.)
2. Spherical silica (average particle size: 0.4 im), Adoma Fine SO-C2 manufactured by Adomatec Co., Ltd.
3. Spherical silica (average particle size: 4.9 im), Silstar MK-06 manufactured by Nippon Chemical Industrial Co., Ltd.)
4. Spherical silica (average particle size: 40.4 im), Eccelica SE-40 manufactured by Tokuyama Soda Co., Ltd.

The above silica 1 to 4 were compounded at formulations of 1:10 wt %, 2:10.8 wt %, 3:18 wt %, 4:61.2 wt %

TABLE 4

Evaluation of epoxy resin composition

| | Gelling time (second) | Spiral flow (cm) | Hardness of molded article (Barcoal hardness) | Surface of Mold | Soldering crack resistance |
|---|---|---|---|---|---|
| Example 5 | 18 | 31 | 83 | | 10 |
| Example 6 | 20 | 58 | 83 | | 10 |
| Example 7 | 20 | 58 | 81 | | 9 |
| Example 8 | 23 | 64 | 78 | | 9 |
| Comparative Example 4 | 23 | 53 | 70 | x | 8 |
| Comparative Example 5 | 24 | 66 | 67 | x | 8 |
| Comparative Example 6 | 25 | 66 | 67 | x | 8 |

The present invention can provide a phenolic resin giving an epoxy resin excellent in molding property. The production method of the present invention can suppress the mutual reaction of dehydrated bodies of dihydroxy compounds, and the intended phenolic resin can be obtained selectively. Further, even if an epoxy resin composition is molded using an epoxy resin obtained by glycidyl-etherification of a phenolic resin, staining of a mold, and the like are not observed, and the resin composition has excellent hardening property and excellent molding property.

What is claimed is:

1. A method of producing a phenolic resin comprising the following steps (i) and (ii):
   (i) a first step in which a dihydroxy compound represented by the following formula (1) is partially dehydrated by a dehydration reaction,

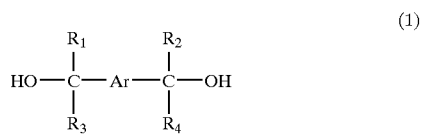

(1)

wherein, Ar represents an aromatic group having 6 to 20 carbon atoms; $R_1$ to $R_4$ represent each independently a hydrogen atom, alkyl group having 1 to 20 carbon atoms, cycloalkyl group having 5 to 20 carbon atoms or aralkyl group having 7 to 20 carbon atoms; $R_1$ and $R_3$ do not simultaneously represent a hydrogen atom, and $R_2$ and $R_4$ do not simultaneously represent a hydrogen atom,
   (ii) a second step in which the partially dehydrated dihydroxy compound obtained in the first step is reacted with a phenolic compound by mol ratio of 40:100 to 90:100.

2. The method of producing a phenolic resin according to claim 1 wherein the dehydration reaction in the first step is conducted in the range of from 50 to 90% based on the theoretical amount.

* * * * *